Oct. 14, 1924.
A. B. RYPINSKI
1,511,636
CUT-OUT BOX AND METER ADAPTER
Filed May 12, 1921
2 Sheets-Sheet 1
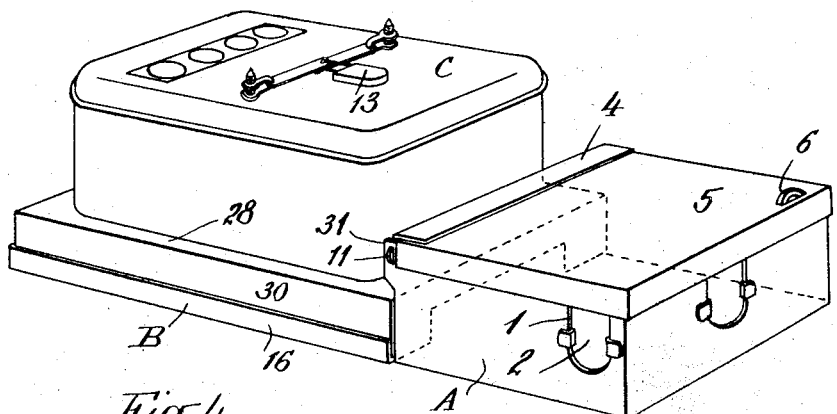
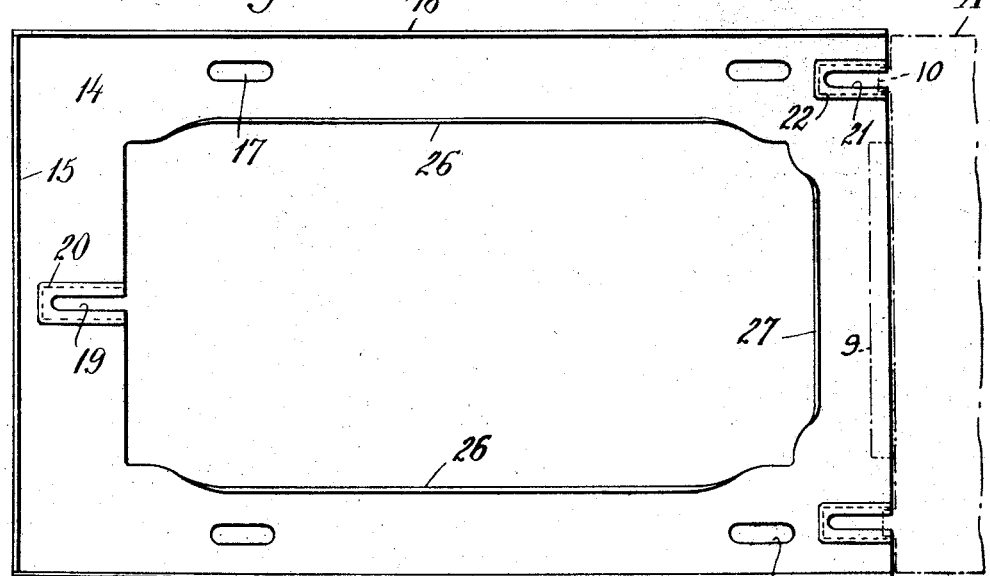
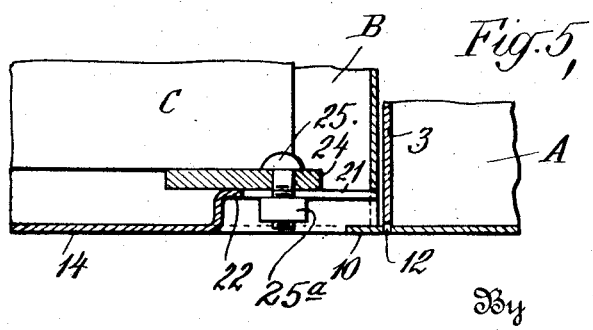
Inventor
ALBERT B. RYPINSKI
By Anthony Mina
Attorney Oct. 14, 1924.

A. B. RYPINSKI 1,511,636

CUT-OUT BOX AND METER ADAPTER

Filed May 12, 1921    2 Sheets-Sheet 2

Inventor
ALBERT B. RYPINSKI
By Attorney

Patented Oct. 14, 1924.

1,511,636

UNITED STATES PATENT OFFICE.

ALBERT B. RYPINSKI, OF BROOKLYN, NEW YORK, ASSIGNOR TO THOMAS E. MURRAY, OF BROOKLYN, NEW YORK.

CUT-OUT BOX AND METER ADAPTER.

Application filed May 12, 1921. Serial No. 468,824.

*To all whom it may concern:*

Be it known that I, ALBERT B. RYPINSKI, a citizen of the United States, residing in Brooklyn, county of Kings, and State of New York, have invented certain new and useful Improvements in Cut-Out Boxes and Meter Adapters, of which the following is a specification.

In arranging electric installations of switches or cut-outs and meters it is customary to mount the cut-out box and meter together by means of a so-called "adapter" of nonmagnetic material surrounding or engaging the points of connection to the meter and providing an enclosure for the wires running from the cut-out box to the meter. My invention provides an adapter and a combination of the same with the meter and cut-out box having certain advantages in the way of cheapness and security.

The accompanying drawings illustrate an embodiment of the invention.

Fig. 1 is a perspective view of the assembled parts;

Fig. 4 is a plan of the lower part of the adapter;

Fig. 5 is a detail in section on the line 5—5 of Fig. 3.

Figure 3:
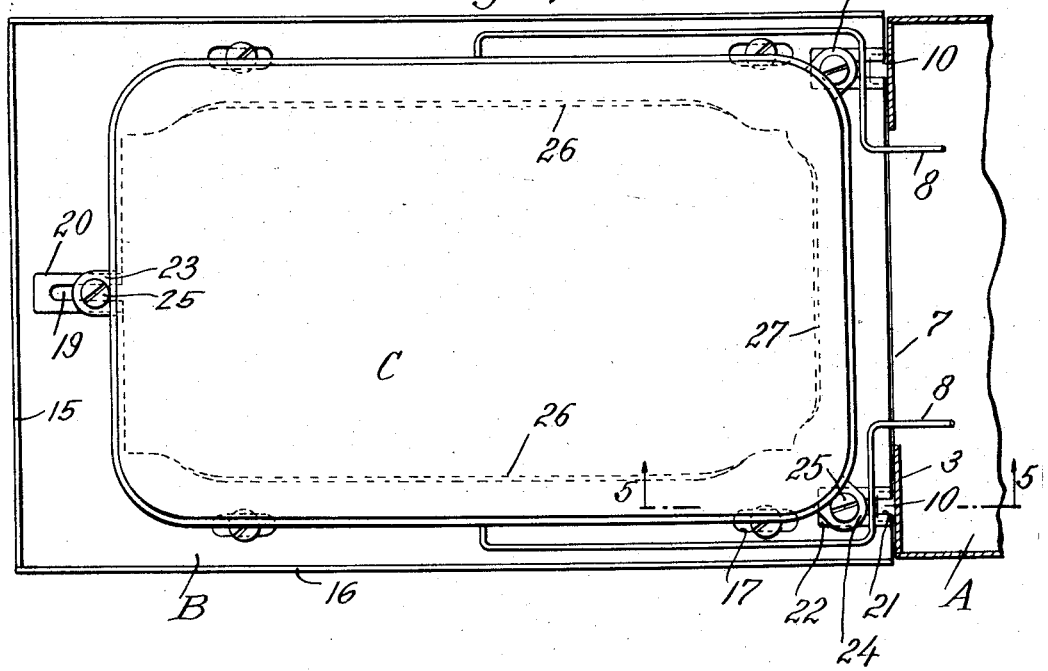
Fig. 3 is a plan of the same with the top of the adapter omitted.

Referring to the embodiment of the invention illustrated the cut-out box is designated as a whole by the letter A, the adapter by the letter B, and the meter by the letter C. The exposed sides of the box are provided with openings 1 having removable shutters 2, the removal of which leaves a passage for the line wires into the box. The inner side 3 of the box has a top flange 4 overhanging the corresponding edge of the cover 5. A perforated lug 6 on the front wall of the box passes up through an opening in the cover and is intended to receive a padlock or seal to prevent unauthorized opening of the box. The inner wall 3 of the box is formed with an opening 7 at the bottom for the passage of wires 8 to the meter. A flange 9 bent out from the wall 3 at the top of the opening enters a corresponding opening in the adapter and serves to hold these two parts in register and also to cover the wires 8. Lugs 10 (Fig. 5) also extend from the bottom of the box into suitable recesses of the adapter to hold the parts in correct register.

The end wall 3 is held in place by lugs 11 at the sides passing through openings in the side walls of the box and also by lugs 12, Fig. 5, passing through openings in the bottom. It is sprung into place and held by these lugs. The entire box is of sheet steel and contains any usual or suitable arrangement of cut-out and other devices, which it is unnecessary to illustrate.

The meter C is enclosed in a casing with a cover fastened by a lock 13, Fig. 1. It is approximately rectangular, with round corners, in plan, and has a pair of wires 8 leading into it at opposite sides; or at various other points in meters of different designs.

Figure 2:
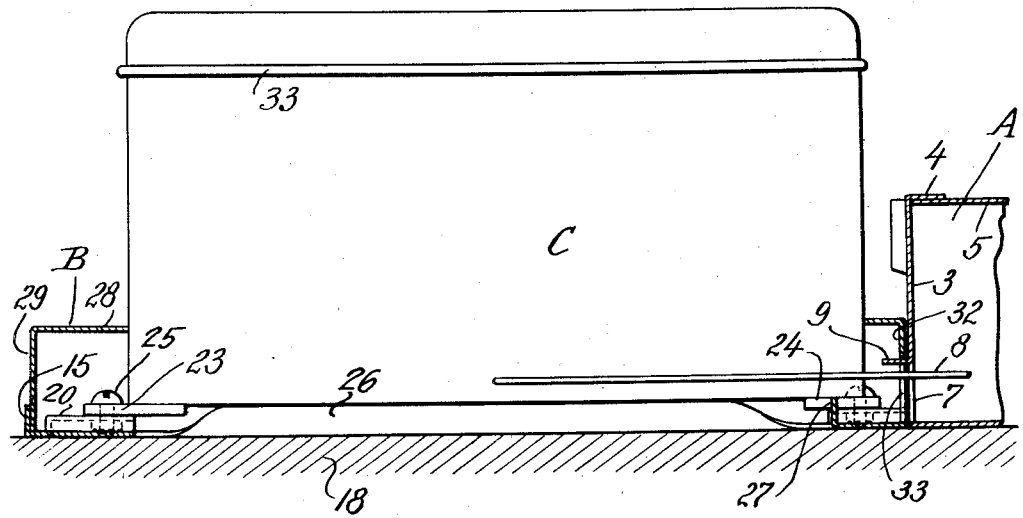
Fig. 2 is a side elevation of the meter with the adjacent parts in section.

The adapter is of zinc. It is made in two parts which when fitted together form an enclosed space around the lower part of the meter so as to enclose the wire connections to the meter box and prevent access thereto. The base 14 is a zinc plate cut-out at the center for economy and having an upward flange 15 on its outer end and similar flanges 16 on the sides. Slots 17 are formed therein for fastening the base of it to a supporting plate 18, Fig. 2, which carries the entire equipment, the cut-out box being similarly fastened on this base by openings through its bottom. The bottom plate 14 of the adapter has also a slot 19 at the outer end, the surrounding metal being pressed upward as at 20 to form a recess on the underside; and a pair of similar slots 21 at the inner end with elevated margins 22 to form recesses on the underside. The meter has a central lug 23 at the outer end and side lugs 24 at the inner end and is fastened on the base of the adapter by means of bolts 25 passing through the lugs and through the slots in the bottom plate and carrying nuts 25ª (Fig. 5) on their lower ends which fit the recesses and are held therein against rotation. The slots 19 and 21 all open in the same direction, that is toward the inner end of the adapter. This facilitates the mounting of the meter on the base of the adapter after the latter is fastened on its support. The meter, with the bolts in place carrying their nuts on their lower ends is shoved sidewise into position, bringing the bolts into the slots. The bolts are then tightened by means of a screw driver or other suitable tool. The edge of the bottom plate 14 around the central opening therein is bent up to form side ribs 26 and an end rib 27 on which the meter rests directly. The meter forms a complete trough for the wires between it and the side walls of the adapter and helps to keep the back plate stiffer and more substantial.

The top of the adapter comprises a flat plate 28 with an opening fitting closely around the meter and with an outer end flange 29 (Fig. 2) and side flanges 30 (Fig. 1) fitting within the flanges 15 and 16 of the bottom. The flanges 29 and 30 are made comparatively short so that the height of the adapter is just sufficient to easily accommodate the wires, thus economizing zinc which is a comparatively expensive metal. By fitting the flanges of the top within those of the bottom it becomes impossible, or practically so, to pry the top up and get at the wires. Also, see Fig. 1, the sides of the cut-out box are provided with lugs 31 which overhang the top of the adapter at its inner end and interfere with the lifting of it. At its inner end the top 28 of the adapter is bent down to form a flange 32 (Fig. 2), the lower part of this flange being cut away to form an opening 33 for the passage of the wires.

In assembling the parts, the bottom of the adapter is fastened on the supporting plate and the meter (without its cover) fastened in place thereon and the wires therefrom brought around and across the end of the bottom plate. The top of the adapter is then dropped into place. The top of the meter is then put on and locked. The edge 33 (Fig. 2) of the top of the meter overhangs the edge of the opening in the top plate B of the adapter so that it prevents the lifting of the latter after the meter casing is closed and locked. The cut-out box is then brought up against the end of the adapter and fastened on the supporting base, the wires connected, and the cover of the box fastened down.

In this combination the parts are held securely in place and the wires protected from improper access, being enclosed within the adapter or the box and being covered by the flange 9 where they pass from one to the other. The inner side 3 of the box cannot be removed because of its bearing against the end of the adapter and because of the engagement of the flange 9 with the latter.

The parts are all designed so that they may be cheaply stamped out of comparatively thin sheet steel or zinc (or other non-magnetic material) and the quantity of such zinc used is only that which is sufficient to surround the meter and to enclose the wires.

Though I have described with great particularity of detail a certain embodiment of my invention yet it will be understood that the invention is not restricted to the specific embodiment disclosed. Various modifications thereof in detail and in the arrangement of the parts may be made by those skilled in the art without departure from the invention.

What I claim is—

1. An electric installation including in combination a cut-out box and an adapter for connecting a meter thereto, said adapter comprising a bottom adapted for attachment to a fixed base and for attachment to the meter, said bottom having a central opening with edges bent upward to form a rest for the base of the meter.

2. A meter adapter comprising a base adapted to be attached to a meter and having open ended slots permitting the sidewise introduction of fastening devices for securing the meter on said base and having recesses on the underside for receiving and holding parts of said fastening devices.

3. The combination of a meter and a meter adapter having a base on which the meter is mounted and a cover with an opening permitting it to pass over the meter, the meter having a cover which when in place extends beyond the edge of said opening and prevents the removal of the adapter cover.

In witness whereof, I have hereunto signed my name.

ALBERT B. RYPINSKI.